(12) United States Patent
Error et al.

(10) Patent No.: US 7,792,844 B2
(45) Date of Patent: Sep. 7, 2010

(54) CAPTURING AND PRESENTING SITE VISITATION PATH DATA

(75) Inventors: Brett M Error, Orem, UT (US); John Pestana, Provo, UT (US)

(73) Assignee: Adobe Systems Incorporated, San Jose, CA (US)

( * ) Notice: Subject to any disclaimer, the term of this patent is extended or adjusted under 35 U.S.C. 154(b) by 1393 days.

(21) Appl. No.: 10/609,008

(22) Filed: Jun. 27, 2003

(65) Prior Publication Data

US 2004/0059746 A1  Mar. 25, 2004

Related U.S. Application Data

(60) Provisional application No. 60/393,002, filed on Jun. 28, 2002.

(51) Int. Cl.
*G06F 7/00* (2006.01)
(52) U.S. Cl. ...................................... 707/754
(58) Field of Classification Search ........................ None
See application file for complete search history.

(56) References Cited

U.S. PATENT DOCUMENTS

| 2002/0042750 | A1 | 4/2002 | Morrison |
| 2002/0067360 | A1 | 6/2002 | Chi et al. |
| 2002/0070953 | A1 | 6/2002 | Barg et al. |
| 2002/0152284 | A1 | 10/2002 | Cambray et al. |
| 2002/0165936 | A1 | 11/2002 | Alston et al. |
| 2003/0023712 | A1 | 1/2003 | Zhao et al. |
| 2003/0055883 | A1 | 3/2003 | Wiles, Jr. |
| 2003/0128231 | A1* | 7/2003 | Kasriel et al. ............... 345/736 |
| 2003/0130982 | A1 | 7/2003 | Kasriel et al. |
| 2003/0131097 | A1* | 7/2003 | Kasriel et al. ............... 709/224 |

FOREIGN PATENT DOCUMENTS

| JP | H7-225770 | 8/1995 |
| JP | 200263102 | 2/2002 |
| JP | 2002123516 | 4/2002 |

OTHER PUBLICATIONS

Jason I. Hong, Tim Sohn, James A. Landay, Jeffery Heer, Tara Matthews, "What Did They Do? Understanding Clickstreams with the WebQuilt Visualization System," WebQuilt homepage http://guir.berkeley.edu/projects/webquilt/, pp. 1-7.

(Continued)

*Primary Examiner*—Kavita Padmanabhan
(74) *Attorney, Agent, or Firm*—Robert C Kowert; Meyertons, Hood, Kivlin, Kowert & Goetzel, P.C.

(57) ABSTRACT

Node sequence data, such as website visitation records, are filtered, analyzed, and summarized in reports. An administrator can designate particular target paths of interest in terms of a checkpoint node sequence. Node sequences are filtered based on the checkpoint node sequence, without regard to any additional or tangential nodes appearing in the sequences. In addition, node sequences can be specified in terms of specific nodes of interest along with wild cards. Reports depict the relative frequency of occurrence of node sequences using visual indicators such as line thickness and/or color.

30 Claims, 18 Drawing Sheets

OTHER PUBLICATIONS

Jason I. Hong, James A. Landay, "WebQuilt: A Framework for Capturing and Visualizing the Web Experience," WebQuilt, homepage: http://guir.berkeley.edu/projects/webquilt/, pp. 1-8, May 1-5, 2001.

Shiota, Shinji, Japan, Kabushiki Kaisha AScii, ASCII network PRO ("Everyone is happy to share the information Let's create an in-company portal!"), Oct. 1, 2000, vol. 5, 10th issue, pp. 193-208.

Nakajima, Tsunoru "Web Log Analysis Tool", Nikkei Internet Technology, Japan, Nikkei BP-sha, Aug. 22, 1998, 14th issue, pp. 122-129.

Uneda, Junji and Yokota, Haruo, "Common Sequence Analysis of Web Logs", Institute of Electronics, Information and Communication Engineers, May 17, 2002.

* cited by examiner

CAPTURING AND PRESENTING SITE VISITATION PATH DATA

CROSS-REFERENCE TO RELATED APPLICATIONS

The present application claims priority from U.S. Provisional Patent Application Ser. No. 60/393,002 for "Sequence Analysis Engine," filed Jun. 28, 2002, the disclosure of which is incorporated herein by reference.

The present application is related to U.S. Utility patent application Ser. No. 10/608,515 for "Efficient Click-Stream Data Collection," filed on Jun. 26, 2003. The disclosure of the related application is incorporated herein by reference.

The present application is further related to U.S. Utility patent application Ser. No. 10/608,442 for "Custom Event and Attribute Generation for Use in Website Traffic Data Collection," filed on Jun. 26, 2003. The disclosure of the related application is incorporated herein by reference.

BACKGROUND OF THE INVENTION

1. Field of the Invention

The present invention relates generally to website usage tracking, and more specifically to improved techniques for capturing and presenting site visitation path data.

2. Description of the Related Art

Website providers often wish to collect data that describes usage and visitation patterns for their websites and for individual web pages within the sites. Such information can be extremely valuable in developing usage statistics for various purposes, including for example estimating server load, determining advertising rates, identifying areas of websites that are in need of redesign, and the like.

When surfing the Web using a browser such as Internet Explorer (available from Microsoft Corporation of Redmond, Wash.), users have the ability to move from one page to another by various means, such as: clicking on links within pages; typing in Uniform Resource Locators (URLs); clicking on dedicated buttons in the browser (such as Back, Forward, and Home); or selecting from a list of favorites. In addition, users can open and close new browser windows at will. As users of web browsers have grown more sophisticated over the years, they have become increasingly adept at such navigation. Furthermore, as connection speeds have increased, users have become less hesitant to click on links at will, and then back up if the information presented by the link is not of interest or is of merely momentary interest.

As a result, users often take a somewhat wandering approach through pages of a website, including side trips and tangents. The user eventually reaches the end of a theoretically linear path of pages, but may have visited some tangential pages along the way. Such tangential pages may be part of the same web domain as the linear path, or they may be external to that domain.

For example, in performing a somewhat linear task such as purchasing an item from an online retailer, there are a series of steps that are generally represented by web pages: searching for the desired item; selecting the item by putting it in a shopping cart; activating a checkout function; providing shipping and billing information; and indicating final approval. However, along the way, the user may visit some tangential pages. For example, he or she may check the shipping costs on item; or he or she may check the price of the item at a competitor's page; or he or she may, for whatever reason, check the weather forecast. The linear path of pages is eventually visited, in a discernable sequence; these tangential pages are merely momentary distractions along the way.

In many contexts, website administrators are interested in analyzing the site visitation paths of users of their websites. Visitation to the tangential pages may be of little or no interest to such administrators; alternatively, administrators may be interested in certain tangents but not others. What is needed, therefore, is a system that allows website administrators to specify which pages are of particular interest, so that other pages are ignored when performing site path capture and analysis. What is further needed is a system that captures and analyzes site path information based on the configuration options selected by the website administrator, and which is capable of ignoring visits to pages that are of no interest to the administrator. What is further needed is a system and method for presenting site visitation path data to an administrator in a graphical, easy-to-understand manner.

SUMMARY OF THE INVENTION

The present invention provides improved techniques for collecting, filtering, and analyzing site path data for users of websites, so as to provide analytical tools for better understanding the sequential relationship between web pages of a site. The website administrator can identify a series of nodes, or web pages, in a site as checkpoints, and can configure the system of the invention to provide information as to a particular visitation path through the checkpoints. The system then presents usage statistics for the specified visitation path. According to the techniques of the present invention, the system is able to recognize a visitation path among checkpoints, regardless of whether the user visits other nodes in the course of the checkpoint traversal. Thus, even if a user takes "side trips" through other web pages that are not designated as checkpoints, the present invention is able to provide meaningful site path analysis with respect to those nodes that are designated as checkpoints.

Website administrators can specify checkpoint nodes via a configuration interface. Alternatively, the system of the present invention can designate certain nodes as checkpoints based on particular characteristics, location, name, popularity, or any other factor. In either case, checkpoint configuration can be performed dynamically and can be modified as appropriate based on changing needs or conditions.

The present invention also provides, in one embodiment, graphical displays of site visitation path data that make it easier for web administrators to understand and analyze the information presented. These graphic displays include, for example, differing line thicknesses, colors, and/or other features to indicate relative popularity and frequency of various site paths.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE INVENTION

The following description sets forth an embodiment wherein the invention captures data relating to user visitation of individual web pages within a website. However, the description is merely illustrative of the techniques of the invention; one skilled in the art will recognize that the techniques of the invention can be applied in any context wherein it is desirable to capture and analyze sequential relationships among nodes. In addition, as described below, the invention can also capture sequential data at levels of granularity other than at the page level, such as for example groups of web pages designated collectively as nodes.

System Architecture

Figure 1:
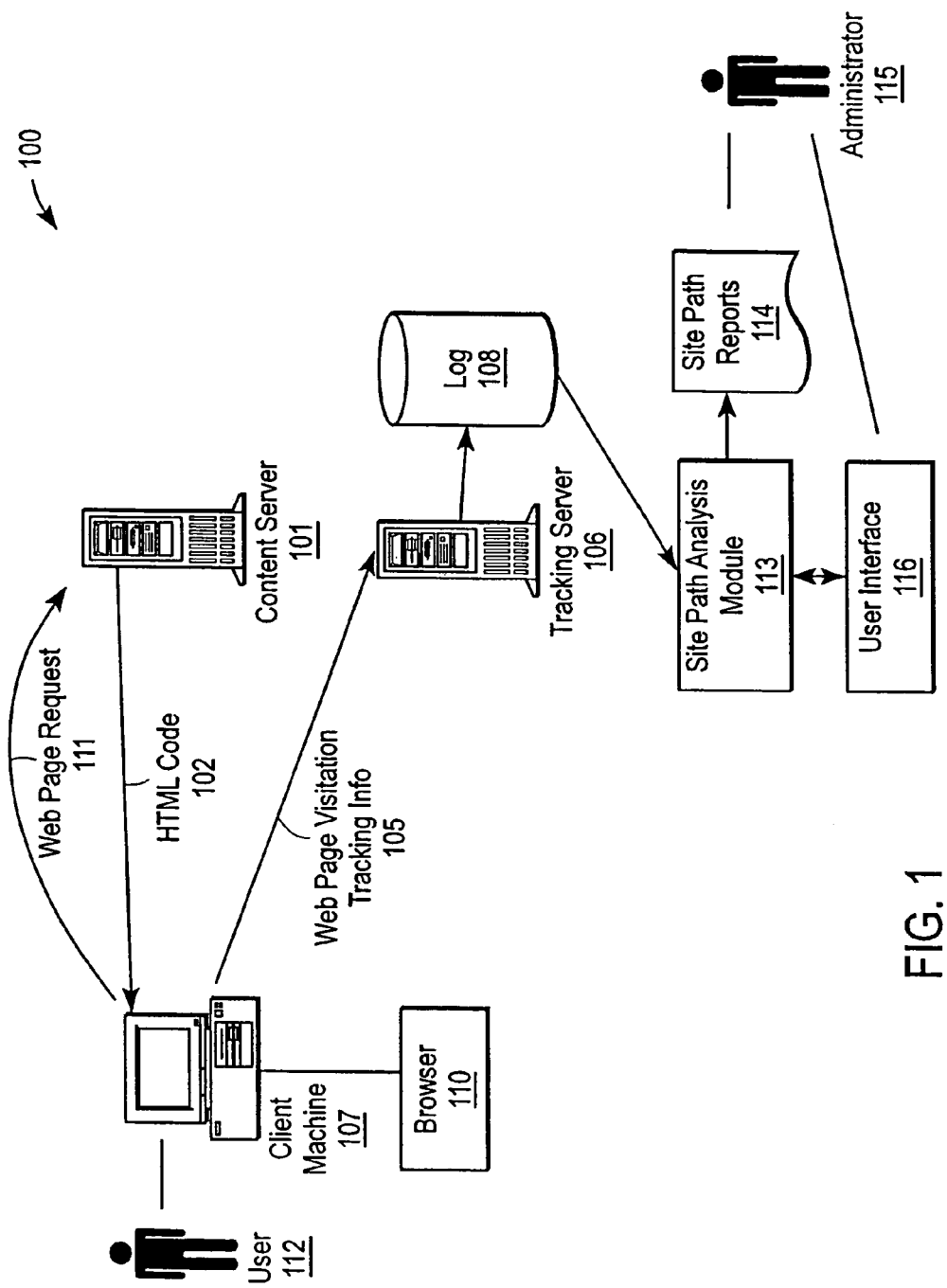
FIG. 1 is a block diagram depicting a system for website traffic data collection according to the prior art.

Referring now to FIG. 1, there is shown an example of a system 100 for website traffic data collection for implementing the present invention. User 112 interacts with client machine 107, which runs a software application such as browser 110 for accessing and displaying web pages. In response to a user 112 command such as clicking on a link or typing in a URL, client machine 107 issues a web page request 111 that is transmitted via the Internet to content server 101. In response to request 111, content server 101 transmits HTML code 102 to client machine 107. Browser 110 interprets received HTML code 102 to display the requested web page on client machine 107.

Client machine 107 also transmits web page visitation tracking information 105 to a tracking server 106, which is typically a separate server operated by a third-party website traffic statistic service. Tracking information 105 typically includes a user identifier, as well information describing the pages visited and the dates and times of the visits. Tracking information 105 can be transmitted from client 107 to tracking server 106 according to well-known techniques. For example, one well-known technique is to embed a pointer to a resource, known as a "web bug," in HTML code 102. The resource is typically invisible to the user, such as a transparent one-pixel image. The pointer directs machine 107 to request the resource from tracking server 106. Tracking server 106 records the request in a log 108, and records additional information associated with the request (such as the date and time, and possibly some identifying information that may be encoded in the resource request). Thus, tracking server 106 records the occurrence of a "hit" to the web page. Tracking server 106 also transmits the requests one-pixel image 109 to client machine 107 so that the resource request is satisfied.

Site path analysis module 113 retrieves stored tracking data from log 108, filters the data, and outputs reports 114 to a web administrator 115. Reports 114 may be provided in hard copy, or via a display screen (not shown), or by some other means. Administrator 115 can request particular types of reports, and can configure the filtering, analysis, and output operations via user interface 116, as will be described in more detail below. Reports 114 include, for example, overviews and statistical analyses describing the relative frequency with which various site paths are being followed through the website. Examples of such reports are described below.

Module 113 and user interface 116 may be implemented in software running on server 106 or on another computer that can access log 108. In one embodiment, the present invention is implemented primarily within module 113 and user interface 116.

Site Visitation Paths

Figure 2:
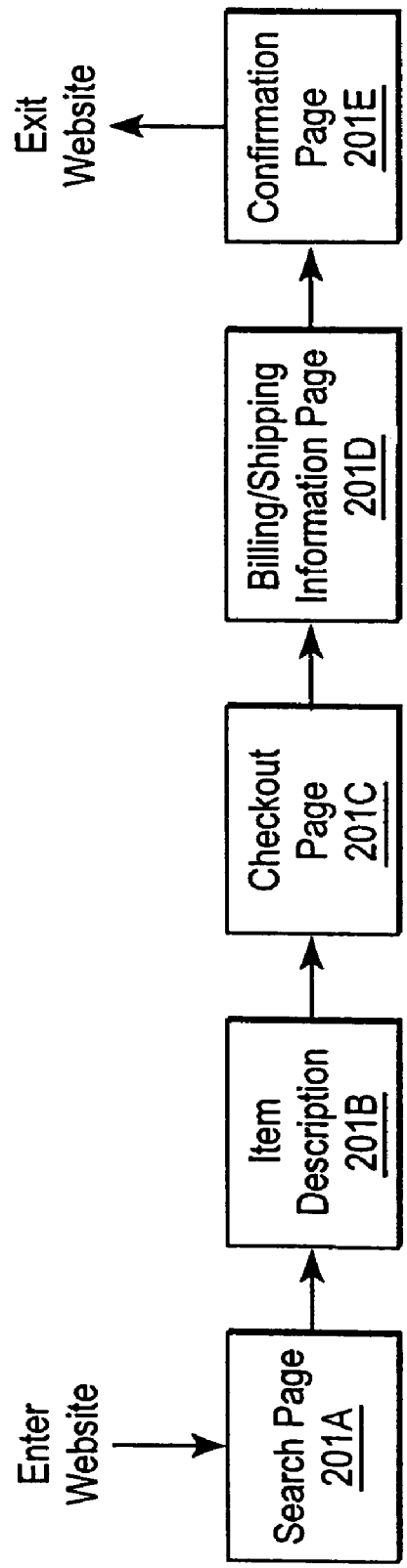
FIG. 2 depicts an example of a sequence of web pages visited by a user in the course of purchasing an item from an online retailer.

Referring now to FIG. 2, there is shown an example of a sequence of web pages, or nodes 201, visited by a user in the course of purchasing an item from an online retailer. As is typical in such transactions, the user enters the website (by, for example, typing the URL for the website, or selected from a Favorites menu, or clicking on a link) and is presented with a search page 201A. Upon entering the appropriate query terms and executing the search, the user is presented with an item description page 201B, which typically includes a picture of the item and some descriptive information. The user clicks on an "Add to Cart" link and navigates to a Checkout page 201C, where he or she can see the items currently in the cart. The user clicks on another link to reach billing/shipping information page 201D for entering billing and shipping information. After entering such information, the user is presented with a confirmation page 201E where he or she is given the opportunity to review the order and finalize it. The user then exits the website.

Analysis of user navigation through a sequence such as that depicted in FIG. 2 is extremely valuable to website administrators. For example, if users consistently leave the sequence before final confirmation page 201E, it may indicate a problem with the design of the immediately preceding page, or some other failing of the website. If the user exits after viewing the item description 201B, it may indicate that the price is too high. One skilled in the art will recognize that many other types of useful information can be gleaned from analysis of site path sequences such that of FIG. 2. In addition to helping website administrators understand sequential relationships among pages in their websites, node sequence analysis can be useful in any context where sequences of nodes occur as part of a process. Examples include the sequence of content groups viewed on a web site, the order of items added to a shopping cart, and the like.

Sequential data is organized into nodes, wherein each node is an occurrence of the item being examined. For illustrative purposes, the following discussion focuses primarily on web pages as examples of nodes. However, one skilled in the art will recognize that the present invention can be applied to analysis of other types of nodes arranged in a sequence, and that a given sequence can even include different types of nodes.

Techniques for collecting site path sequences, such as that shown in FIG. 2, are well known in the art. A particular user is recognized as he or she moves from page to page using conventional techniques such as cookies, web bugs, and/or session variables. The mechanics of such user tracking are well known in the art, and need not be described in detail here. User web page visit records are stored in sequence according to they time that they occurred.

Each visitation record typically contains two types of information: an identifier of the page visited, and metadata that provides further criteria for filtering and analyzing the sequential data. The type of metadata stored can vary according to the particular application. For example, metadata may include a URL indicating the referrer to the first page that began the sequence. Alternatively, such information might be stored in the identifier field of a separate record, along with metadata indicating that that particular record contains a referrer URL rather than a URL for a page within a site. In other contexts, different types of information can be stored.

In one embodiment, sequential data is organized into groups of nodes, designated as "sessions." Each session can contain any number of nodes. The particular criteria for classifying nodes into sessions can vary. One method of organization is to group together, in a single session, all web page visits caused by a single source that occur with less than a specified amount of time between them. Thus, for example, in analyzing path sequences through a website, each session can is represented by all pages visited by a single user where no more than 30 minutes passed between page requests. Since different users may be accessing the website simultaneously, several sessions of sequential data (one per active user) are often built simultaneously.

The present invention improves upon existing techniques by providing a mechanism by which tangential web pages can be ignored in site path sequence analysis operations. Thus, a user who passes through nodes 201A through 201E in the course of a session, as shown in FIG. 2, but who also visited some tangential pages during the session, would be counted in the statistical analysis in the same manner as a user who passes through nodes 201A through 201E without visiting any tangential pages.

Figure 3:
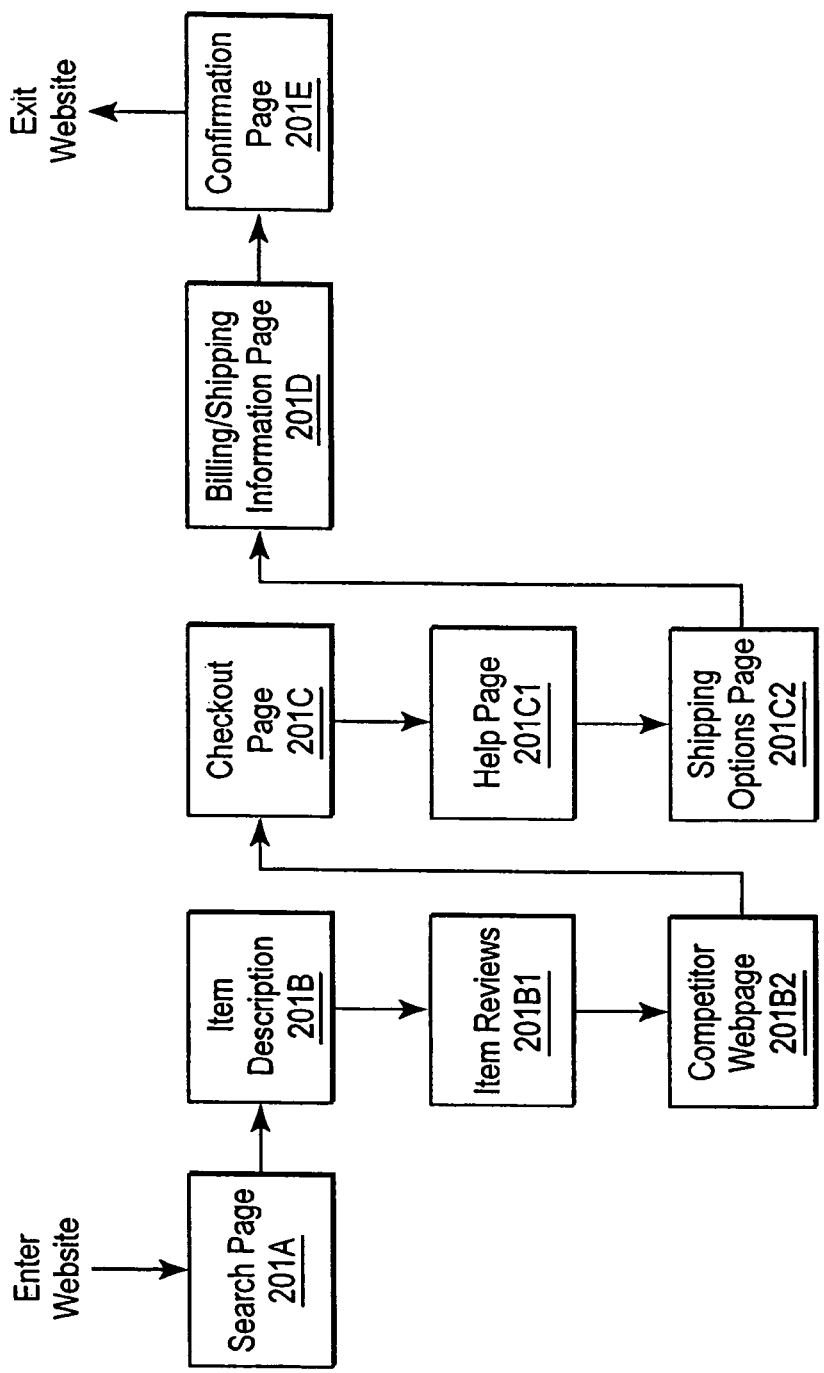
FIG. 3 depicts an example of a sequence of web pages visited by a user in the course of purchasing an item from an online retailer, including tangential pages.

An example of a user visiting tangential pages is shown in FIG. 3. Here, the same five nodes 201A through 201E are shown. However, between nodes 201B and 201C, the user visits page 201B1 to view some reviews of the item, and page 201B2 to compare prices at a competitor's web page. Additionally, between nodes 201C and 201D, the user visits help page 201C1 to look for some information about shipping options, and clicks on a link in page 201C1 to see a shipping options page 201C2. Many other types of tangents, both within the website and external to it, are possible.

Site Path Pattern Masks

In one embodiment, the present invention allows the website administrator to specify particular paths of interest by indicating a sequence of pages. Thus, if the administrator wishes to obtain statistics as to how many users follow the path shown in FIG. 2, he or she can define the particular pages 201A, 201B, 201C, 201D, and 201E as a sequence of interest. The sequence of interest is referred to herein as the target path. Module 113 extracts information from log 108 to determine how many users follow the target path, and provides a report 114 to the administrator. This is accomplished by applying a filter to stored data to generate a report including actual user visitation paths that match the target path. The administrator can indicate any desired path of interest. If, for example, the administrator indicated the target path as pages 201B, 201C, and 201D, report 114 would include information for all users that followed that path, whether or not the path was preceded by page 201A and succeeded by page 201E. If desired, however, the administrator can specify that the target path must appear at some particular point within the sequence (for example at the beginning of the sequence). But, in the absence of such a specification, module 114 includes all sessions that have the particular sequence of node values specified in the target path, regardless of whether the sequence occurs at the beginning, end, or at some point in the middle of the session.

In one embodiment of the present invention, the administrator can use pattern masks (also known as "regular expressions") in specifying the target path. Pattern masks are a way to represent a target sequence of nodes in a manner that can include specific nodes, values, ranges of values, and/or "wild cards." For example, at any particular node position in the target path, the pattern mask may indicate any of the following:

a specific node (page) to be matched (e.g., "page1.htm")

a list or range of nodes (pages), any of which is considered a match (e.g., "[page1.htm,page2.htm,page3.htm]" or "page[1-3].htm")

a wild card (e.g., "?" to indicate any single node, or "*" to indicate zero or more nodes); wild cards match any page.

For example, the administrator may specify the target path: 201B ? ? 201C ? ? 201D Module 113 would then include in its reports any visitation path wherein the user visited page 201B, then any two pages, then page 201C, then any two pages, then page 201D. In addition, pages may be specified in terms of URLs, page names, or any other means; the use of reference numbers herein is for illustrative purposes only.

In another example, the administrator can specify an absolute position for the sequence with respect to the start or the end of a session. For example, the administrator may specify the target path:

START OF SESSION ? 201B

Module 113 would then include any visitation path where node 201B was the second item encountered after starting the session.

One skilled in the art will recognize that the above syntax is merely exemplary, and that other techniques for specifying target paths can be provided. In addition, pages may be specified in terms of URLs, page names, or any other means; the use of reference numbers herein is for illustrative purposes only.

In general, then, pattern masks afford the administrator great flexibility in specifying target paths. Once the desired target path has been specified, module 113 provides reports for the specified visitation path. More complex data analysis can also be performed, including predictions of likely future behavior based on statistical analysis of visitation paths. For example, given a data set consisting of the following sessions (nodes are given as letter values A through F for illustrative purposes):

A->B->C->D
B->A->E->G
B->C->A->->C
A->F->C
B->C

Filtering for sessions using target path B->C->? would yield the following results:

1 occurrence of B->C->D
1 occurrence of B->C->A
1 occurrence of B->C->END OF SESSION Based on this dataset, one can predict that there is a 33% chance that if nodes B and C occur in a session, that A will be the next node to occur. There is also a 33% chance that the session will end.

Additionally, filtering for sessions which match the mask A->?->C would yield the results:

1 occurrence of A->B->C
2 occurrences of A->F->C

Based on these results one can conclude that node F is twice as likely to be traversed when moving from node A to node C with one node in between.

Finally, one can also understand which patterns lead up to a given node. For the mask ?->?->C one would get the results:

1 occurrence of START OF SESSION->B->C
2 occurrences of A->F->C

This yields useful information concerning the most common ways users get to node C.

Figure 9A:
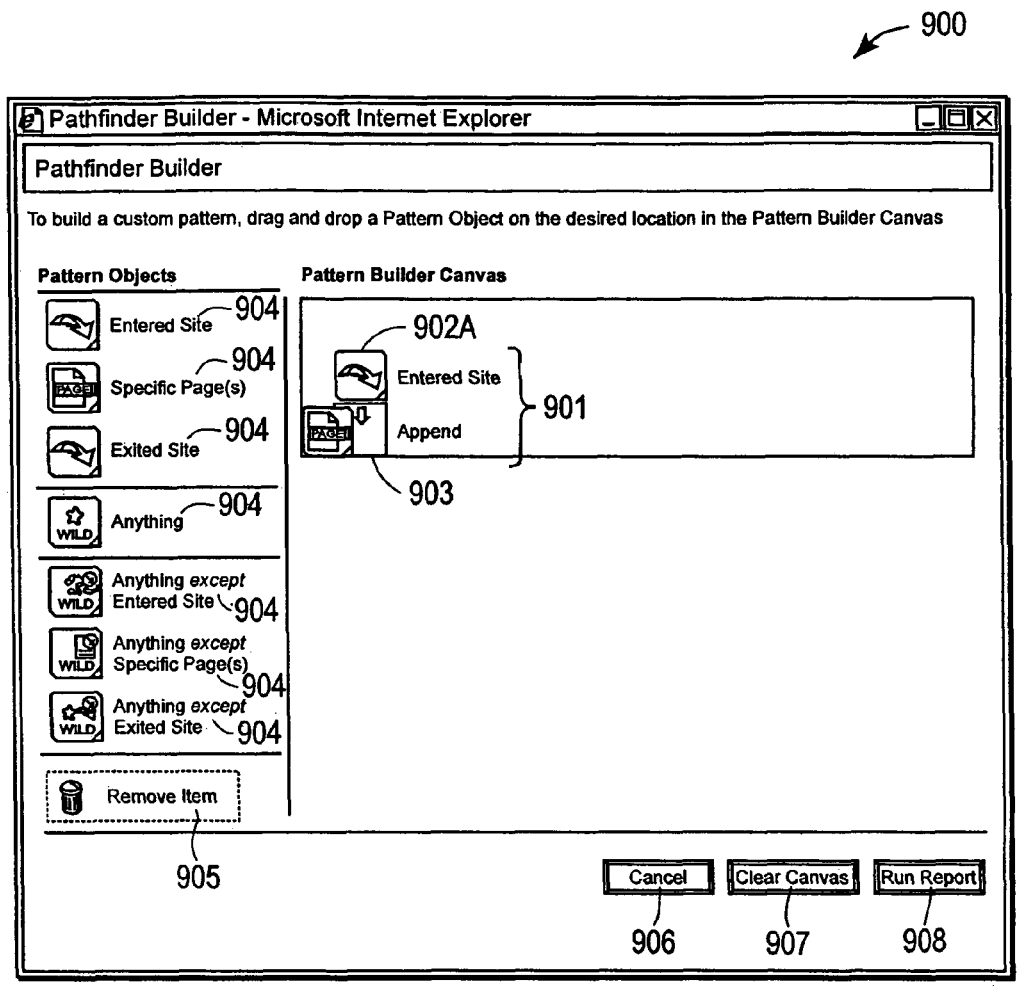
FIGS. 9A and 9B depict an example of a user interface for constructing a target path including wild cards.
Figure 9B:
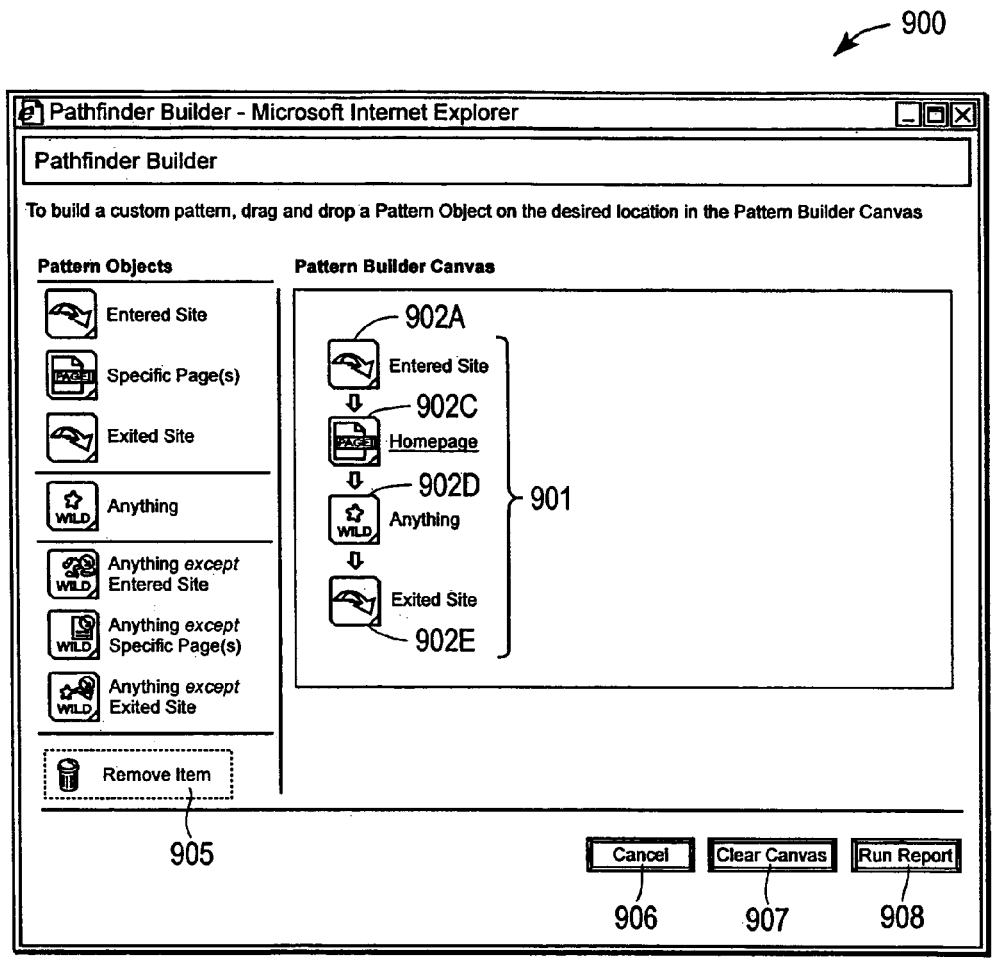

Referring now to FIGS. 9A and 9B, there is shown an example of a user interface for constructing a target path including wild cards. Dialog box 900 provides easy-to-use buttons, icons, and tools that allow an administrator to construct the target path.

Target path 901 is represented by one or more icons 902 such as 902A, 902B, and the like. Pattern object buttons 904 add any of several types of icons 902 to the target path 901 being constructed. In the examples, pattern object buttons 904 include:

Entered site: allows the administrator to include, in target path 901, user's initial entry into the website;
Specific page(s): allows the administrator to specify one or more specific pages to be included in target path 901;
Exited site: allows the administrator to include, in target path 901, user's exit from the website; and
Wild card: allows the administrator to include a wild card in target path 901.

In the example, four different wild cards can be included: a wild card that matches any web page or website entry/exit, a wild card that matches anything except website entry, a wild card that matches anything except specific pages, and a wild card that matches anything except website exit.

In FIG. 9A, target path 901 includes icon 902A representing the user's initial entry into the website. Append button 903 allows the administrator to add another icon to target path 901. In one embodiment, the administrator clicks on append button 903 and then clicks on a pattern object button 904 to append the specified item to target path 901. In another embodiment, the administrator drags the desired pattern object button 904 to append button 903. If the selected pattern object button 904 requires specifying one or more specific web pages, the administrator is given an opportunity to specify web pages, for example via a dialog box (not shown) that allows selection from a list of web pages, or that allows the user to type in web page identifiers, or the like.

In one embodiment, the administrator can add icons 902 to any point within target path 901 by dragging a pattern object button 904 onto an existing icon 902 in target path 901. In one embodiment, this results in insertion of a new icon 902 at the specified position in target path 901. In another embodiment, it results in replacement of the existing icon 902 at the specified position. In yet another embodiment, the administrator can specify whether he or she wishes to insert or replace. The user can also reorder icons 902 within target path 901 by dragging them from one position to another.

Remove Item button 905 removes the selected icon from target path 901. In one embodiment, the administrator drags an icon 902 from target path 901 to button 905 to delete the icon. In another embodiment, the administrator clicks on the icon 902 to select it and then clicks on button 905 to delete the icon 902.

Cancel button 906 cancels the target path creation process and dismisses dialog box 900. Clear canvas button 907 removes all icons 902 from target path 901. Run report 908 initiates the process of retrieving and filtering records to generate a report using the specified target path 901. In one embodiment, any or all of buttons 906, 907, and 908 cause a confirmation dialog box (not shown) to be presented before the action is actually performed.

FIG. 9B depicts target path 901 after several icons 902 have been added. The target path 901 represented in FIG. 9B is as follows:

USER ENTERS SITE HOMEPAGE ? USER EXITS SITE

Thus, the target path 901 of FIG. 9B would match any visitation path where the user entered the site via the home page, then visited any single page, and then exited the site.

One skilled in the art will recognize that the user interface depicted in FIGS. 9A and 9B is merely exemplary, and that other layouts, icons, methodologies, or modes of operation of the user interface can be provided without departing from the essential characteristics of the present invention. In one embodiment, the user interface of FIGS. 9A and 9B can include a search function similar to that described below in connection with FIG. 10.

Checkpoint Nodes

In another embodiment, certain nodes, or pages 201, are designated as "checkpoints," meaning that they are of importance in analyzing website visitation paths. The administrator specifies the target path in terms of checkpoints. When determining whether a particular visitation sequence matches the target path, module 113 ignores any visits to non-checkpoint nodes. Furthermore, when aggregating results to present statistical reports to the administrator, module 113 considers all instances of a particular sequence of checkpoint nodes to be equivalent, regardless of the presence or absence of any other (non-checkpoint) nodes within the sequences.

Figure 10:
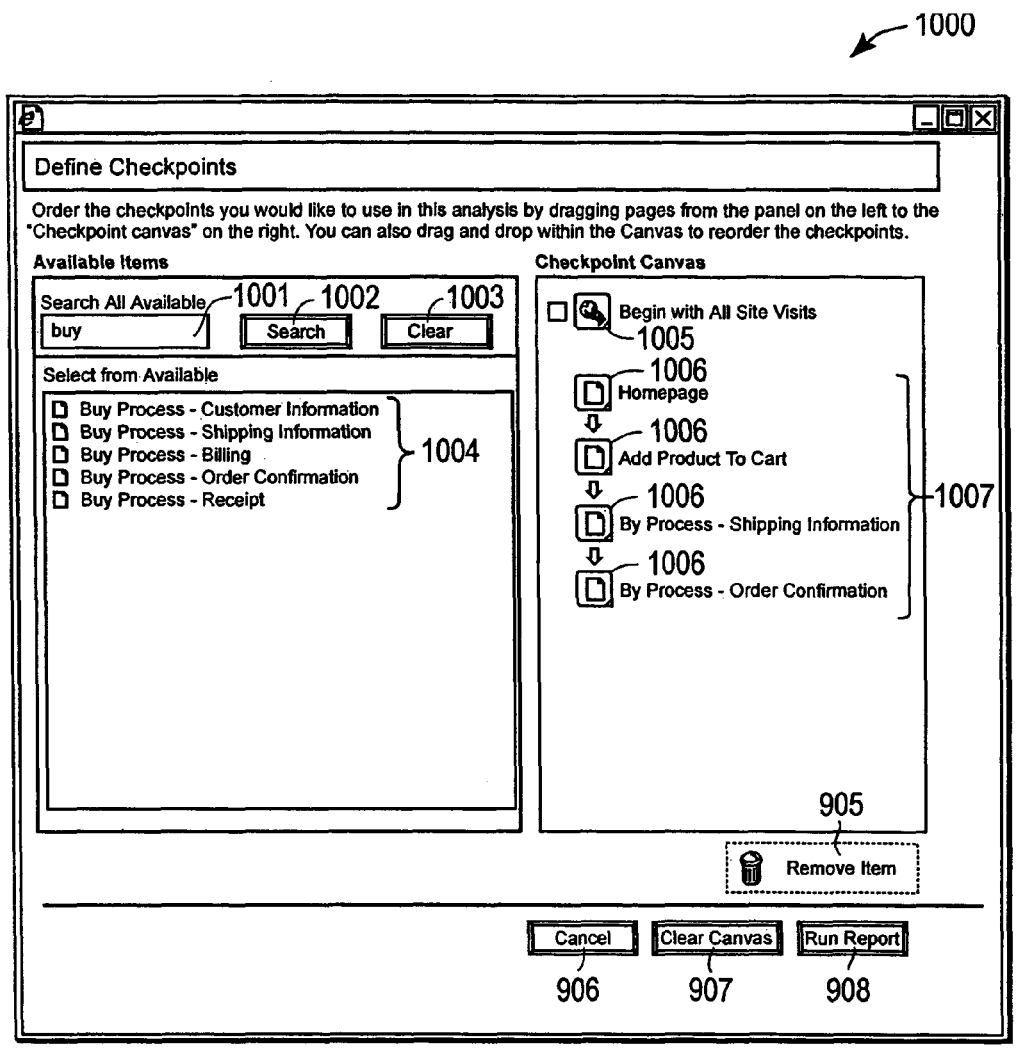
FIG. 10 depicts an example of a user interface for constructing a target path using checkpoints.

Referring now to FIG. 10, there is shown an example of a user interface for constructing a target path using checkpoints. Dialog box 1000 provides easy-to-use buttons, icons, and tools that allow an administrator to construct the target path.

Target path 1007 is represented by a series of icons 1006 representing checkpoints. In one embodiment, dialog box 1000 includes search functionality that allows the administrator to search for a desired page from all available pages. The administrator types one or more keywords in search field 1001, clicks on search button 1002, and can then select pages from the listed results 1004. Clear button 1003 clears search field 1001.

Once search results 1004 are listed, the administrator can drag pages from the listed results 1004 onto target path 1007. The dragged pages as designated as checkpoints and are positioned within target path 1007 as indicated by the administrator. For each page dragged to target path 1007, a new icon 1006 is created and displayed. The administrator can also drag icons 1006 within target path 1007 to reorder checkpoints as desired. Remove item button 905 operates in a similar manner as described above for FIGS. 9A and 9B.

Checkbox 1005 indicates whether the target path 1007 should only match those visitation paths that begin with entry into the website.

Cancel button 906 cancels the target path creation process and dismisses dialog box 1000. Clear canvas button 907 removes all icons 1006 from target path 1007. Run report 908 initiates the process of retrieving and filtering records to generate a report using the specified target path 1007. In one embodiment, any or all of buttons 906, 907, and 908 cause a confirmation dialog box (not shown) to be presented before the action is actually performed.

In the example of FIG. 10, target path 1007 includes four checkpoints, represented by icons 1006. Accordingly, the target path 1007 would match any web visitation path wherein the user visits (in order) the homepage, the Add Product to Cart page, the Buy Process—Shipping Information page, and the Buy Process—Order Confirmation page, regardless of whether any other pages were also visited at any point during the session. The user could visit any other pages before and/or after visiting the listed checkpoints, and/or could visit pages between the listed checkpoints, and the user's visitation path would still be considered a match.

One skilled in the art will recognize that the user interface depicted in FIG. 10 is merely exemplary, and that other layouts, icons, methodologies, or modes of operation of the user interface can be provided without departing from the essential characteristics of the present invention.

In one embodiment, the system automatically designates certain nodes as checkpoints based on particular characteristics, location, name, popularity, or any other factor. For example, the home page, and/or the five most popular pages, can automatically be designated as checkpoints. These automatic, or default, checkpoints can, in one embodiment, be used to construct an initial target path that is then modifiable by the administrator using an interface similar to that shown in Fig.

Examples of Reports

Figure 4:
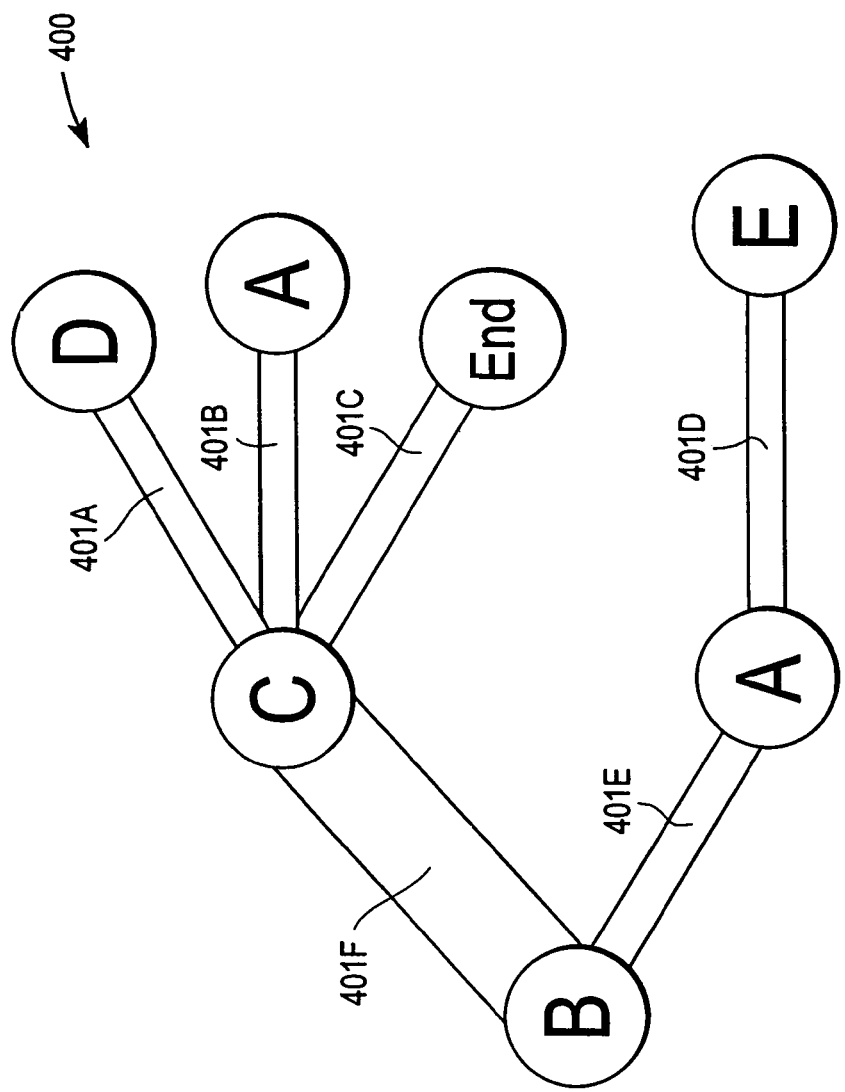
FIG. 4 depicts an example of a web page visitation graph according to one embodiment.

Referring now to FIG. 4, there is shown an example of a report that can be generated by the system of the present invention. The report is a web page visitation graph 400 that depicts various nodes A through E, along with connection lines 401 between nodes. Each connection line 401 indicates, by its thickness, how many users traveled the path between the two nodes connected by the line 401. Thus, for example, the relatively thick line 401F connecting nodes B and C indicates that the path from node B to node C is relatively heavily traveled. By contrast, the relatively thin line 401B connecting nodes C and A indicates that that path is relatively lightly traveled. This type of web page visitation graph 400 thus provides the web administrator with a clear overall view of traffic through the website.

The particular graph 400 shown in FIG. 4 corresponds to the sample data set discussed above:

A->B->C->D
B->A->E->G
B->C->A->F->C
A->F->C
B->C

Filtering for three-node or fewer patterns that start with node B would yield the following results:

1 occurrence of B->C->D
1 occurrence of B->A->E 1 occurrence of B->C->A
1 occurrence of B->C->END OF SESSION Thus, as shown in FIG. 4, there are two connections 401E, 401F from initial node B—one to node A and one to node C. The connection between nodes B and C is three times the thickness of the connection between B and A, since the B-to-C path has been traversed three times as frequently as the A-to-C path. Additional connections branch from node A to node E (401D), from node C to node D (401A), from node C to node A (401B), and from node C to END OF SESSION (401C). These connections are of equal thickness as they occur with the same frequency.

In one embodiment, connections and/or nodes themselves are colored to provide additional representation of the strength of the relationship (i.e. greater frequency of traversal) between the given node and the next node in the sequence. For example, if green indicates a higher frequency of traversal, node B and/or connection line 401F could be colored green to indicate the higher frequency of traversal.

Figure 5:
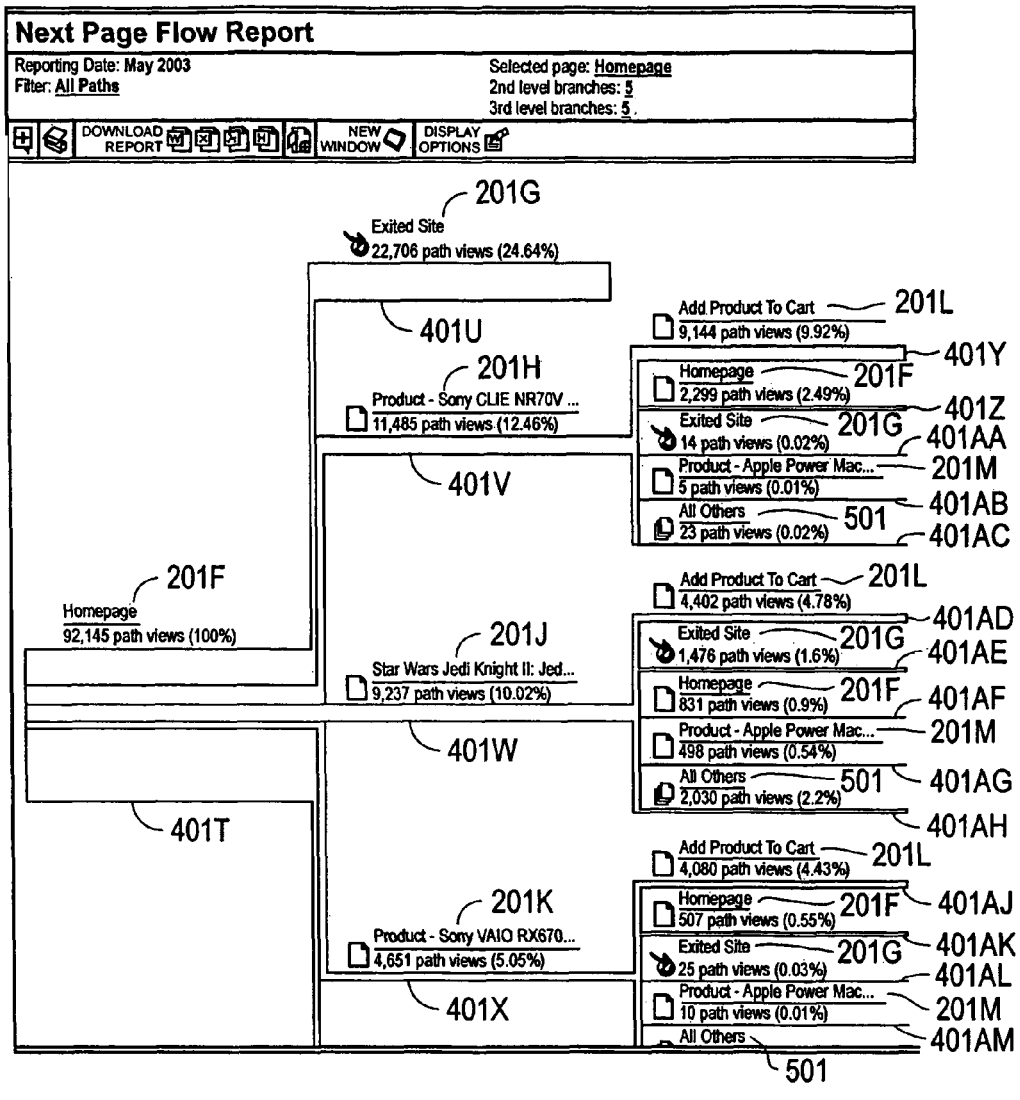
FIG. 5 depicts an example of a web page visitation graph using line thickness and color according to one embodiment.

Referring now to FIG. 5, there is shown another example of a graph 500 that uses varying line thickness, as well as color, to depict relative frequency of traversal. Connection lines 401 connect nodes 201; the colors and thicknesses of lines 401 indicate the relative frequency with which each path is traversed. All others icon 501 represents all other nodes that are not displayed because they are relatively rarely visited.

Graph 500 also indicates the number of times each path was traversed, and the percentage of users, of those visiting a node, that followed each particular path from that node. For example, graph 500 shows that, of those users that visited the homepage, represented by node 201:

- 22,706 users (24.64% of the total users that visited the homepage) followed path 401U, indicating that they exited the site;
- 11,485 users (12.46% of the total users that visited the homepage) followed path 401V, indicating that they visited node 201H;
- 9,237 users (10.02% of the total users that visited the homepage) followed path 401V, indicating that they visited node 201J;

and the like.

Figure 6:
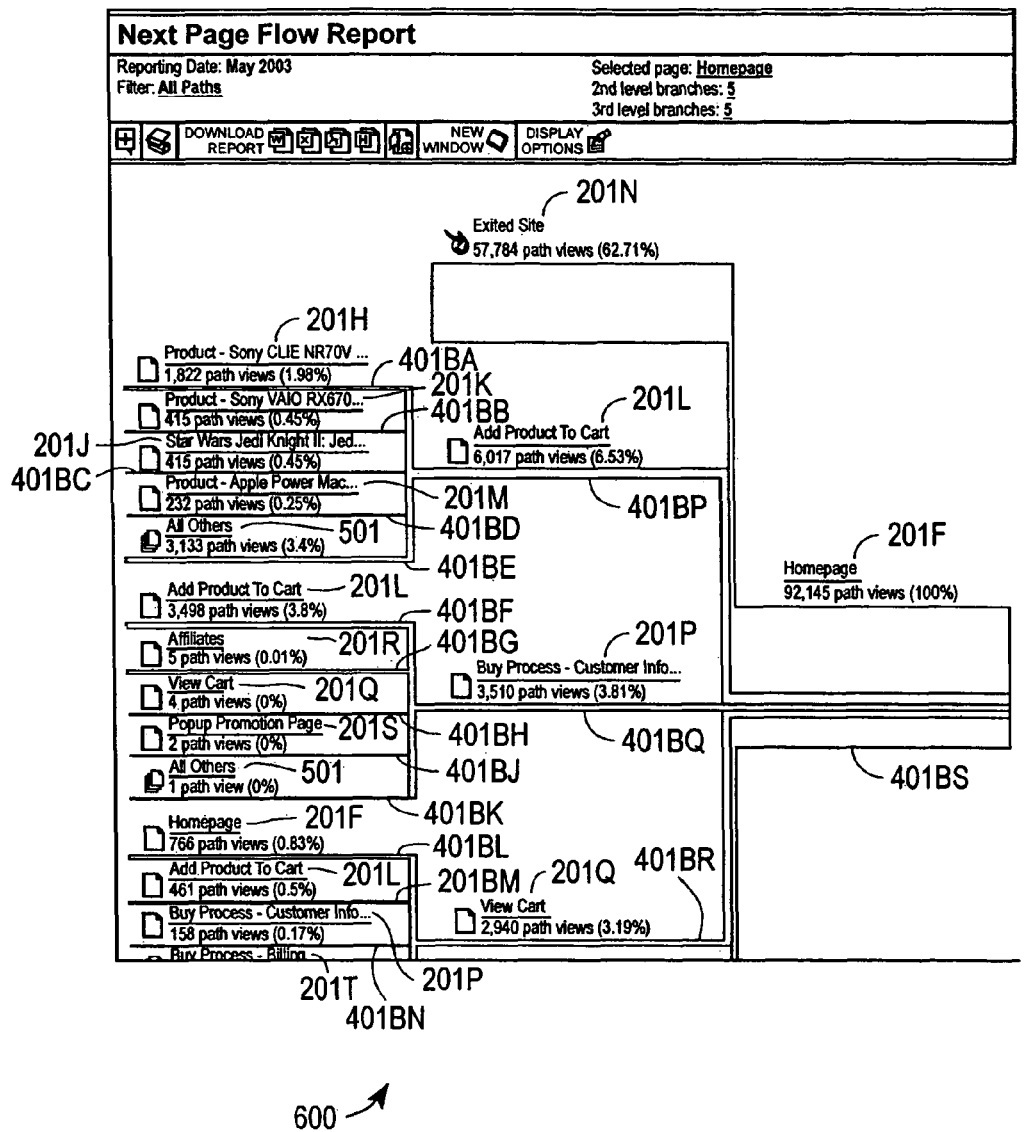
FIG. 6 depicts an example of a web page visitation graph including a converging relationship according to one embodiment.

Referring now to FIG. 6, there is shown another example of a graph 600 that uses varying line thickness, as well as color, to depict relative frequency of traversal. Again, connection lines 401 connect nodes 201, and the colors and thicknesses of lines 401 indicate the relative frequency with which each path is traversed.

Based on the target path provided by the administrator, graph 600 indicates which web pages led to a particular web page (the homepage, represented by node 201F). This is in contrast to graph 500, which indicated which web pages were visited after the homepage. A graph such as 600 provides useful information that indicates where users are coming from when visiting particular pages; this allows administrators to gauge, for example, the relative value of advertising on various websites and pages. The pattern shown in graph 600 is referred to as "convergence."

As with graph 500, graph 600 also indicates the number of times each path was traversed, and the percentage of users, of those visiting a node, that followed each particular path from that node.

Figure 7:
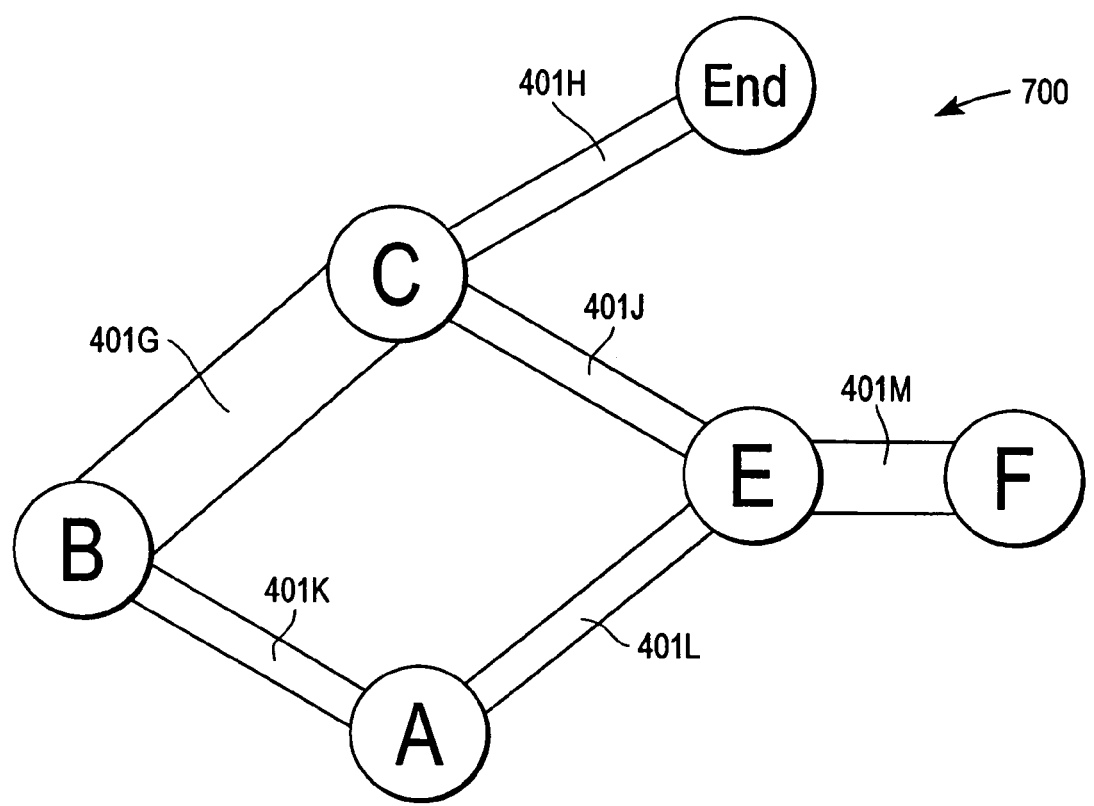
FIG. 7 depicts an example of a web page visitation graph including converging and diverging relationships according to one embodiment.

More complex graphs, including depictions of diverging and converging connection paths, can be generated. Referring now to FIG. 7, there is shown an example of a graph 700 that might result from a pattern mask of:

B->?->E

Connection lines 401G and 401K diverge from node B to nodes C and A, respectively. Lines 401J and 401L represent convergence from nodes C and A to node E. As with the graph of FIG. 4, relative frequency of traversal is indicated by relative thickness of lines.

Figure 8:
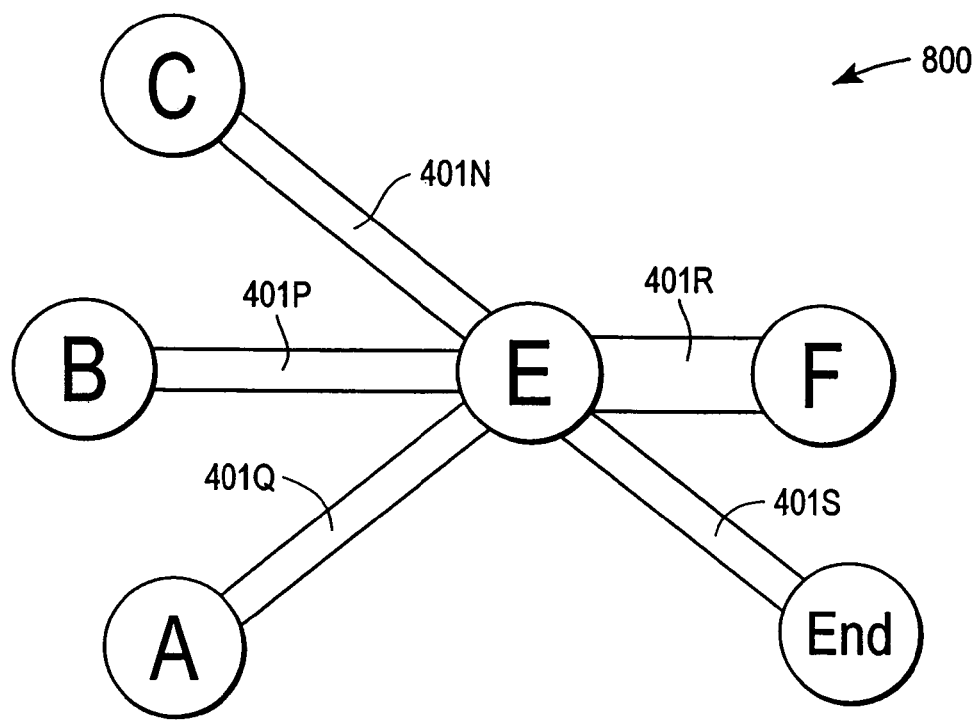
FIG. 8 depicts another example of a web page visitation graph including converging and diverging relationships according to one embodiment.

Referring now to FIG. 8, there is shown an example of a graph 800 that might result from a pattern mask of:

?->E->?

Lines 401N, 401P, and 401Q represent convergence from nodes C, B, and A respectively to node E. Lines 401R and 401S diverge from node E to node F and to the end of the session, respectively. Again, relative frequency of traversal is indicated by relative thickness of lines.

In one embodiment, where graphs are output on a display screen, the administrator can click on the nodes to run further reports with the particular node selected. For example, clicking on node A would show a pop-up menu which would allow the analyst to select a "next node flow" report or a "previous node flow" report (among others) using A as the base node. If the system is able to offer other types of reports, clicking on node A can also be used as a launching point into other reports with node A as a criterion. For example, one could launch a report that would show the frequency with which A appears in the data set.

Figure 11:
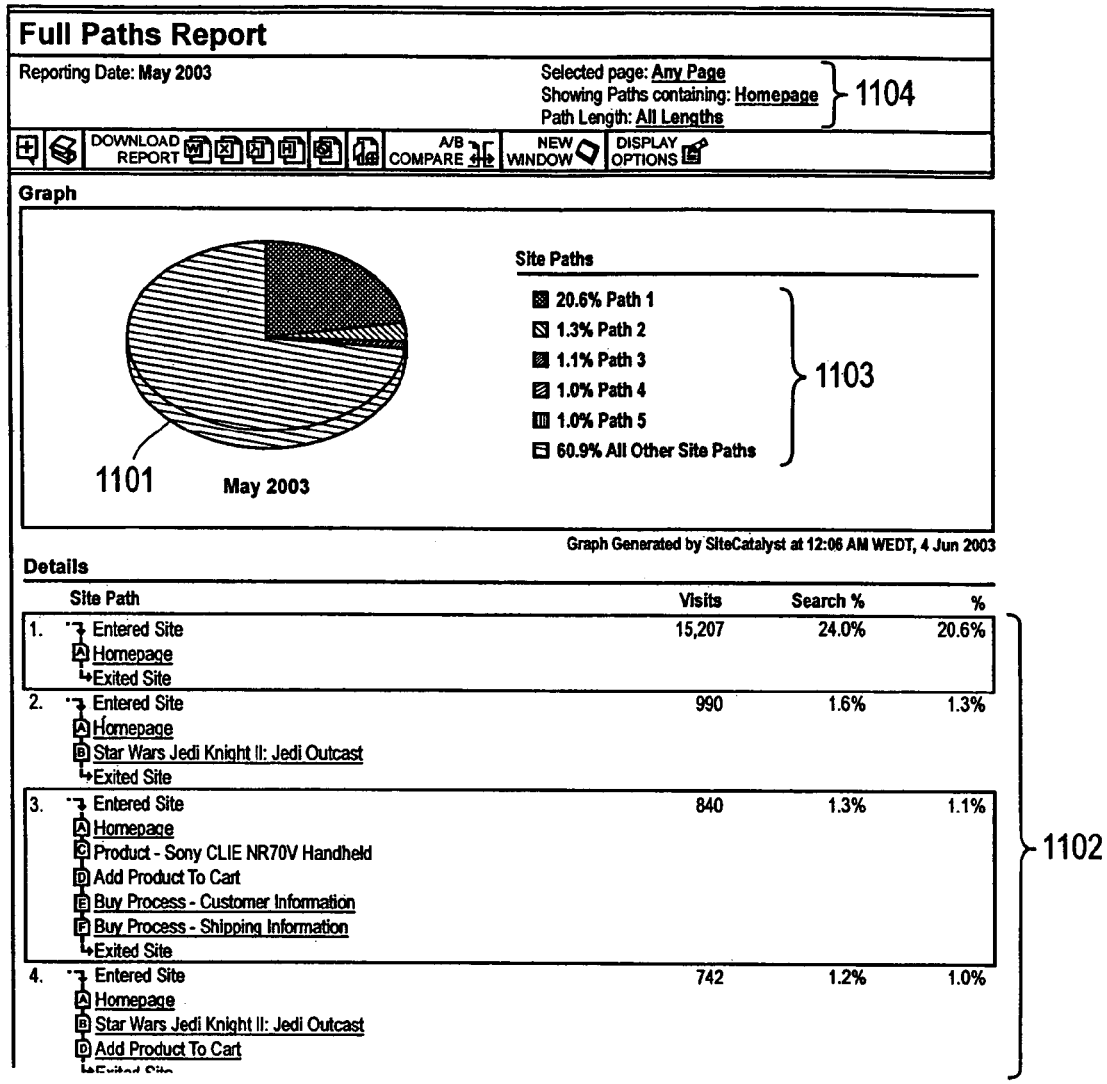
FIG. 11 depicts an example of a report showing relative frequency of path traversal according to one embodiment.

In other embodiments, the system of the present invention generates other types of reports containing different representations of visitation path frequencies. Referring now to FIG. 11, there is shown an example of a report 1100 that shows relative frequency of path traversal in a pie chart 1101, a summary 1103, and in detailed descriptions 1102. Report parameters 1104 are shown; they indicate that the report includes traversal paths beginning with any page and having any length, that include the homepage at some point.

Figure 12:
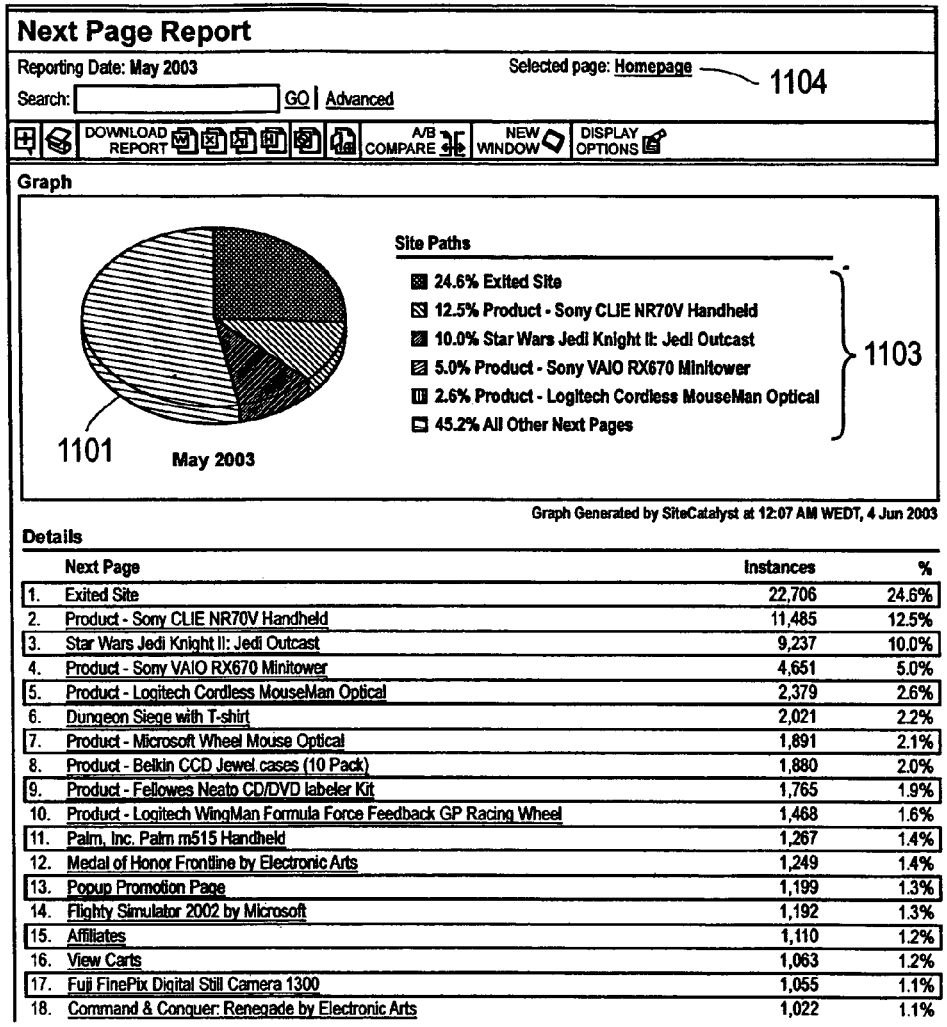
FIG. 12 depicts an example of a report showing statistics concerning the next page visited after a selected page, according to one embodiment.

Referring now to FIG. 12, there is shown a report 1200 similar to that of FIG. 11. However, rather than showing statistics for entire traversal paths, report 1102 provides statistics concerning the next page visited after the homepage. Thus, the percentages in pie chart 1101, summary 1103, and details 1102 indicate the percentage of users that visited each page after visiting the homepage.

Figure 13:
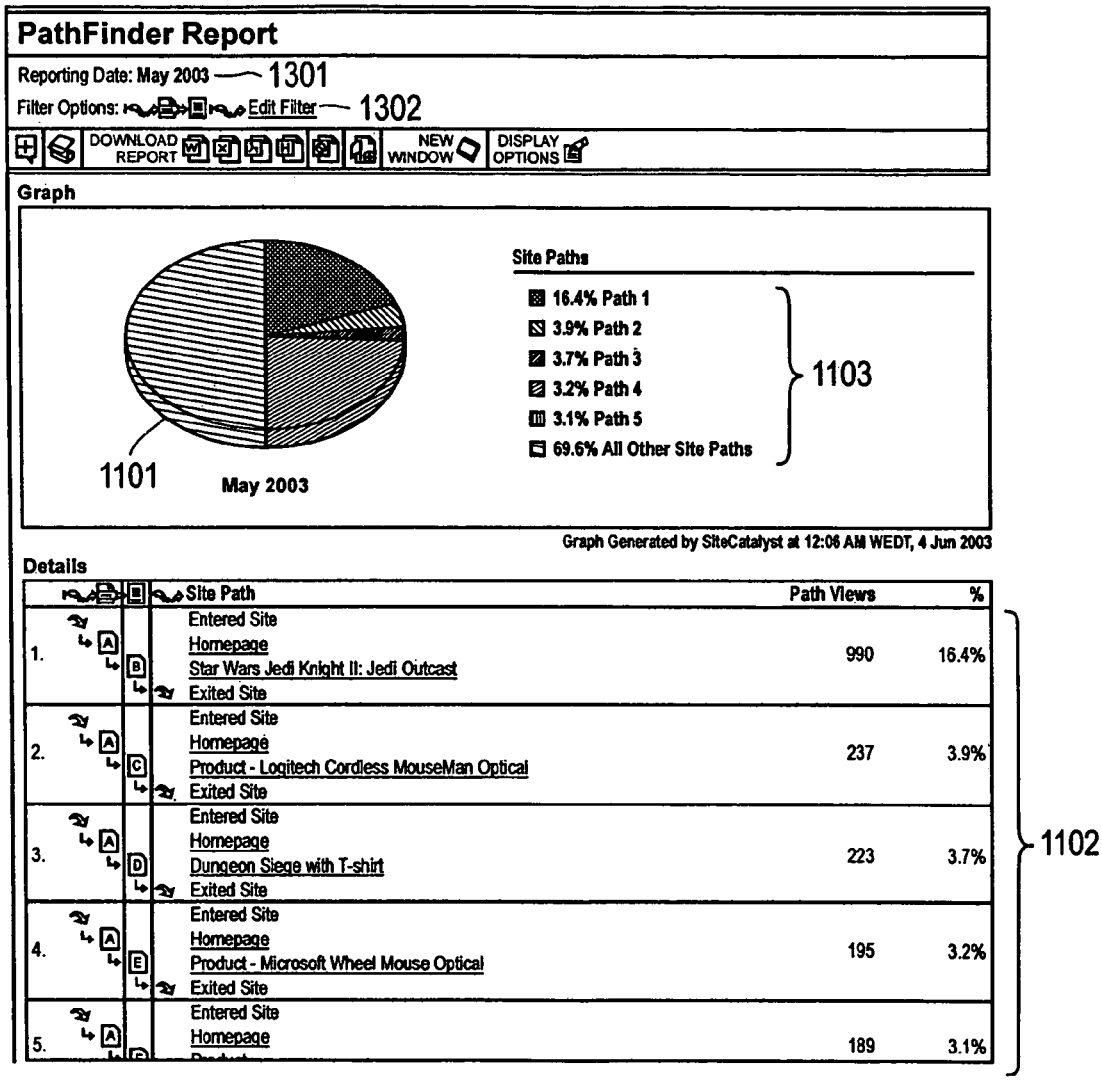
FIG. 13 depicts an example of a report showing relative frequency of path traversal, restricted to particular paths matching a target path, according to one embodiment.

Referring now to FIG. 13, there is shown a report 1300 similar to that of FIG. 11. Here, rather than showing results for all paths, the report is restricted to particular paths matching a target path. A summary of the filter options 1301 for the selected target path is shown. In one embodiment, the target path is constructed using the techniques described above, such as by using wild cards and/or checkpoints. Edit Filter link 1302 presents a screen that allows the administrator to modify the target path using techniques described above. Pie chart 1101, summary 1103, and details 1102 in FIG. 13 depict statistics for web page traversal paths within the set defined by the target path.

Figure 14A:
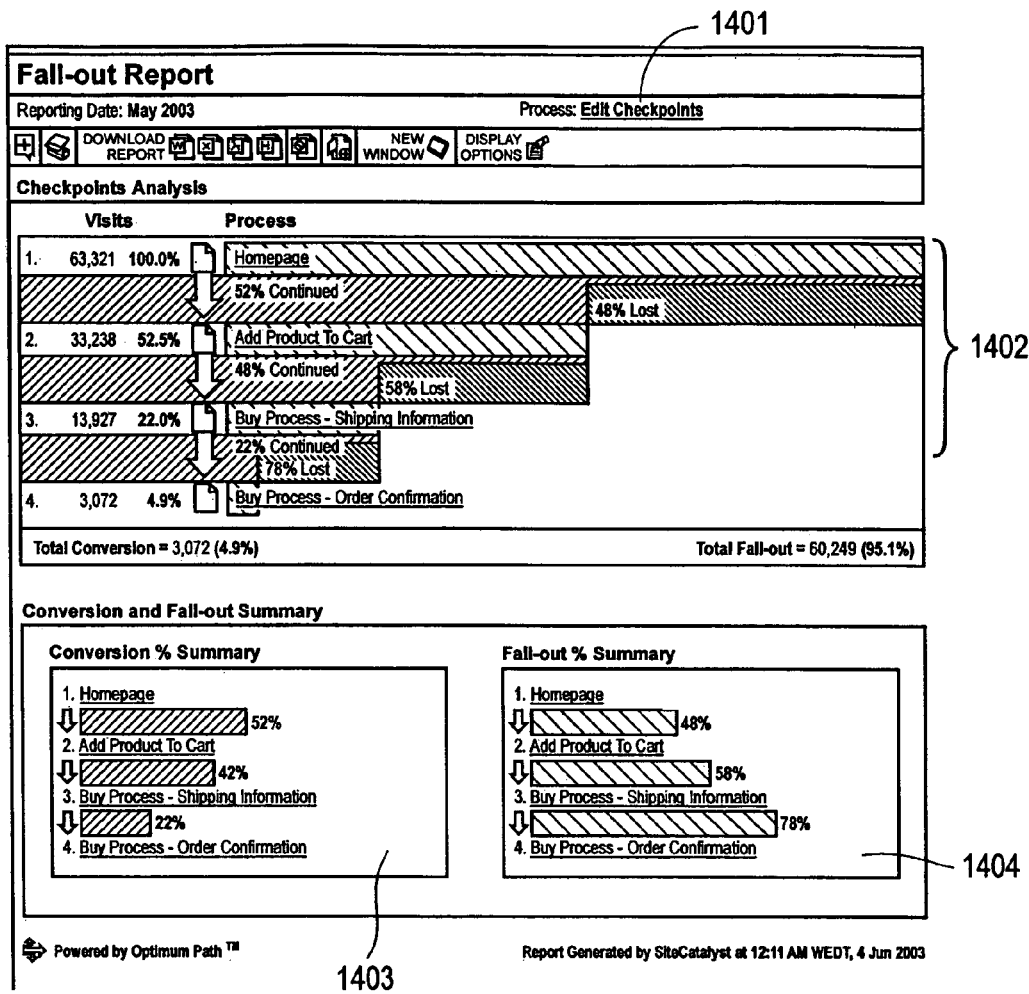
FIG. 14A depicts a fall-out report according to one embodiment.

Referring now to FIG. 14A, there is shown a fall-out report 1400. Report 1400 is based, in one embodiment, on a target path specified in terms of checkpoints as described above. In the example, four pages have been designated as checkpoints: the homepage, the Add Product to Cart page, the Buy Process—Shipping Information Page, and the Buy Process—Order Confirmation page. Report 1400 thus corresponds to the target path 1007 described above in connection with FIG. 10. Edit Checkpoints link 1401 takes the administrator to a screen, such as dialog box 1000, for editing target path 1007.

Report 1400 indicates how many users continued to the next checkpoint in target path 1007, regardless of whether the user visited other, tangential pages before continuing. Users that did not continue are denoted as "lost." Checkpoint analysis 1402 indicates, for example, that of those users that visited the homepage, 52% continued to the Add Product to Cart page and 48% were lost. Of those that visited the Add Product to Cart page, 42% continued to the Buy Process—Shipping Information and 58% were lost. Similar information is displayed for the remaining checkpoints in target path 1007. Cumulative percentages are shown for each checkpoint as well; these indicate the percentage of users reaching that checkpoint, based on the total number of users that visited the homepage at the beginning of target path 1007. The actual number of users that reached each checkpoint is also shown, adjacent to the percentage. The report also includes statistics for total conversion (the number of users that visited all of the checkpoint nodes in the target path) and total fall-out (the number of users that visited the homepage but did not complete the target path) in terms of numbers and percentages.

The same information is summarized in more compact form in conversion percentage summary 1403 and fall-out percentage summary 1404, that form additional portions of report 1400.

Figure 14B:
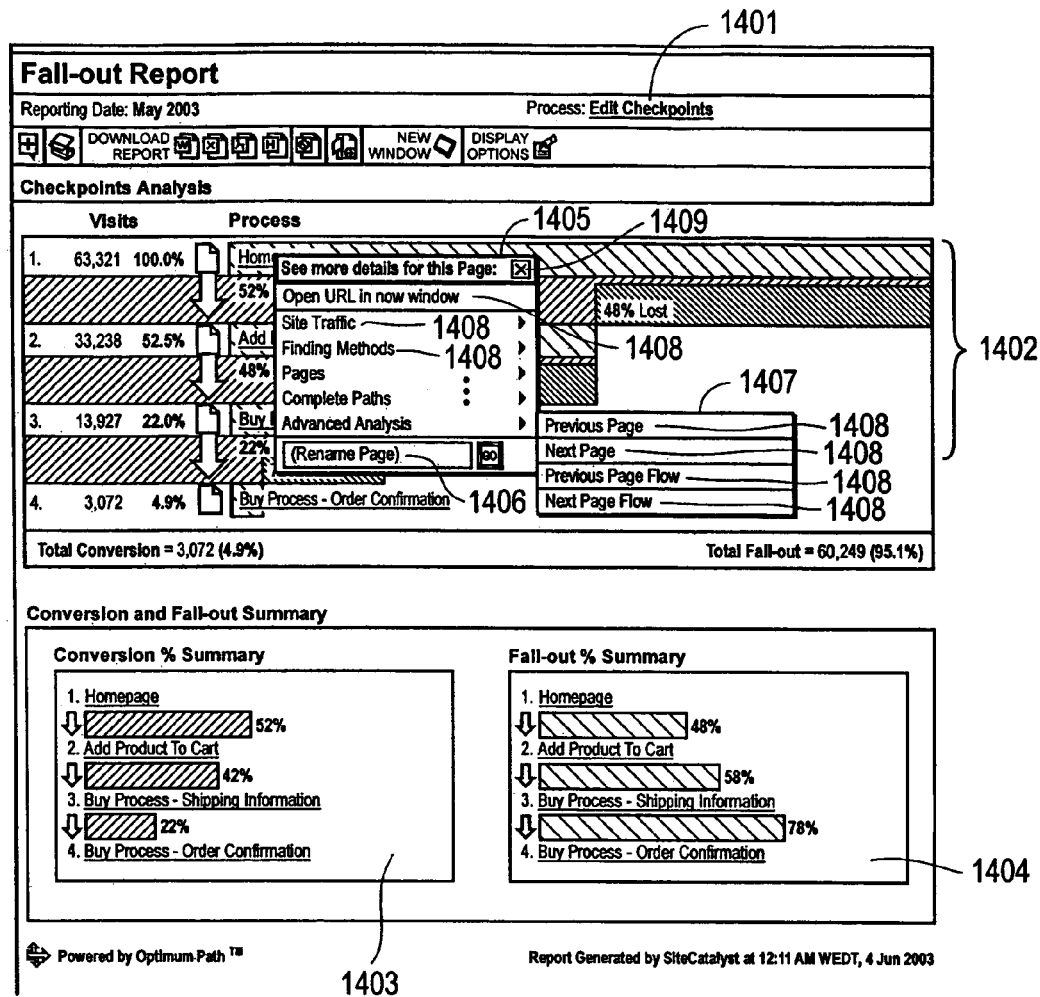
FIG. 14B depicts a context-sensitive menu for an item in a fall-out report, according to one embodiment.

Referring now to FIG. 14B, there is shown context-sensitive menu 1405 for an item in fall-out report 1400. In one embodiment, the administrator can activate menu 1405 for an item, such as one of the checkpoints displayed in checkpoint analysis 1402, by right-clicking on the item. Menu 1405 includes various commands 1408 for viewing different types of reports in connection with the selected item. In addition, submenus such as 1407 are available for selecting particular types of reports within the commands 1408 of menu 1405. In one embodiment, menu 1405 also includes field 1406 that allows renaming of the selected page, and also includes a command 1408 for opening the selected page in a new window. Close box 1409 dismisses menu 1405.

In one embodiment, the same commands 1408 are available from a standard screen menu as is well known in the art.

Figure 15:
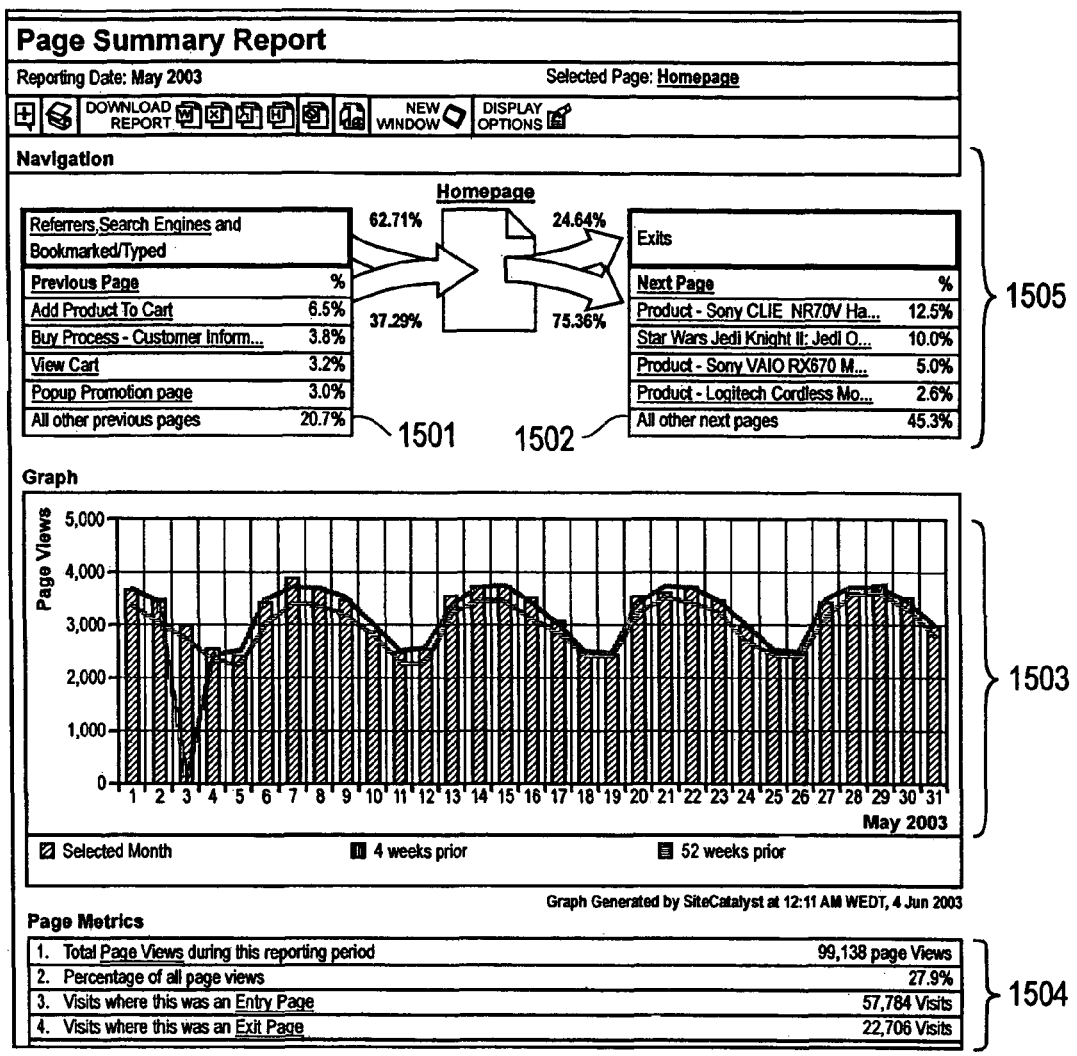
FIG. 15 depicts a page summary report for a selected page according to one embodiment.

Referring now to FIG. 15, there is shown a page summary report 1500 for a selected page (in this case, the homepage of the website). Page summary report 1500 contains an overall navigation analysis 1505, a page view graph 1503, and page metrics 1504 for the selected page. Navigation analysis 1505 provides a Previous Page section 1501 indicating where users came from before they visited the homepage, and a Next Page section 1502 indicating where they went after they visited. In each section 1501, 1502, summary percentages are provided as well as some measure of detail as to specific pages visited.

Page view graph 1503 summarizes traffic to the home page for specific days of the month. Also shown, for comparison purposes, is the traffic four week prior and 52 weeks prior.

Page metrics section 1504 provides additional information summarizing user visits to the home page. Such information includes, for example:

total page views;
percentage of all page views;
visits where the home page was an entry page;
visits where the home page was an exit page;
visits where the home page was the only page visited;
average number of clicks to reach the page;
time spent on page; and
number of reloads.

Figure 16:
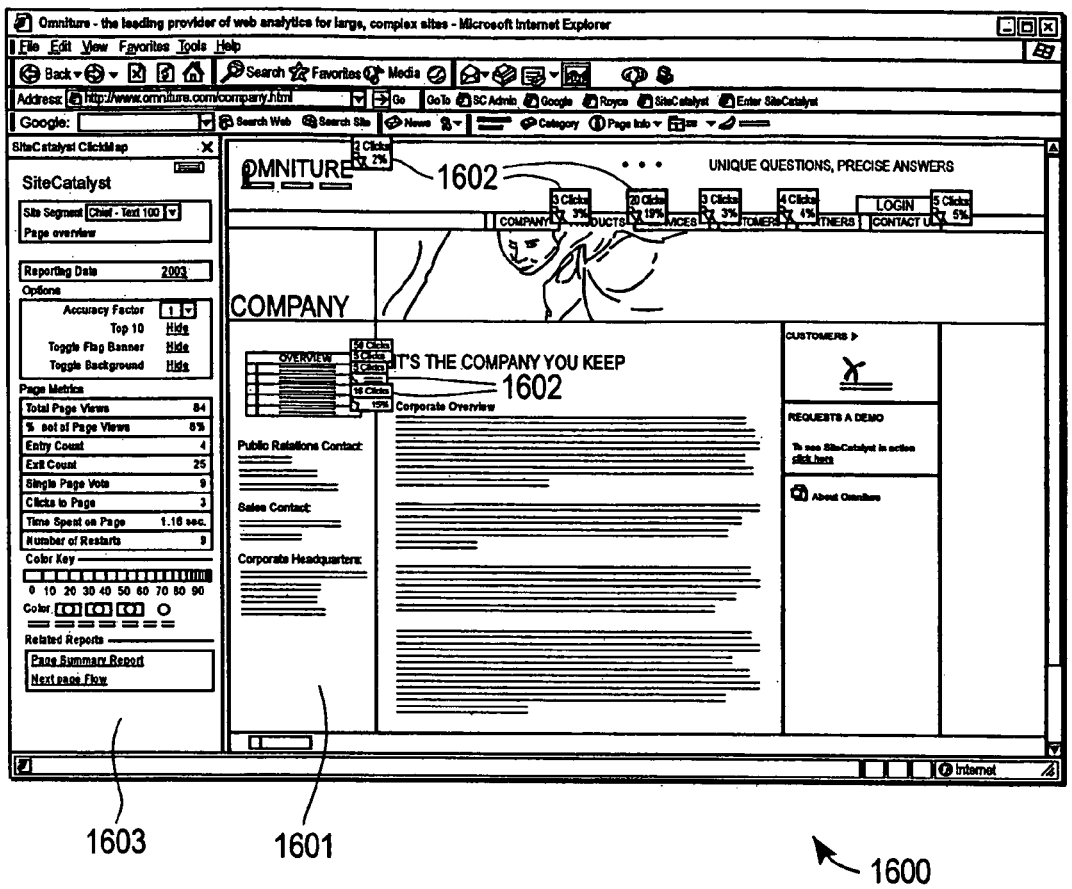
FIG. 16 depicts a click-map report for a selected page according to one embodiment.

Referring now to FIG. 16, there is shown a click-map report 1600 for a selected page according to one embodiment. Here, a representation of the actual web page 1601 is shown. Overlaid on web page 1601 are boxes 1602 showing how many users clicked on the various links within page 1601 over a specified period of time. In the example shown, boxes 1602 include both absolute numbers and percentages. In one embodiment, boxes 1602 are color-coded according to relative frequency with which the underlying link was clicked. In addition, panel 1603 provides additional metrics, options, and links to related pages. Click-map report 1600 is generated, in one embodiment, based on the pattern-matching and/or checkpoint methodologies described above.

One skilled in the art will recognize that reports such as those depicted herein can be generated without using the masking or checkpoint matching techniques described above, and can further be used in contexts other than web page visitation path analysis. In fact, a report similar to those described above can be useful in any context where sequential relationships among nodes are to be analyzed and summarized.

The invention can also capture and present sequential data at levels of granularity other than at the page level. For example, a group of pages could be designated as a node for site path tracking purposes; a visit to any page within the group would be considered a visit to the node. One skilled in the art will recognize that nodes can be defined at any desired levels of granularity, and may exist in other contexts than website surfing.

In the above description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer, network of computers, or other apparatus. Various general-purpose systems may be used with programs in accordance with the teachings herein, or it may prove convenient to construct a more specialized apparatus to perform the required method steps. The required structure for a variety of these systems appears from the description. In addition, the present invention is not described with reference to any particular programming language. It will be appreciated that a variety of programming languages may be used to implement the teachings of the invention as described herein.

As will be understood by those familiar with the art, the invention may be embodied in other specific forms without departing from the spirit or essential characteristics thereof. For example, the particular architectures depicted above are merely exemplary of one implementation of the present invention. The functional elements and method steps described above are provided as illustrative examples of one technique for implementing the invention; one skilled in the art will recognize that many other implementations are possible without departing from the present invention as recited in the claims. Likewise, the particular capitalization or naming of the modules, protocols, features, attributes, or any other aspect is not mandatory or significant, and the mechanisms that implement the invention or its features may have different names or formats. In addition, the present invention may be implemented as a method, process, user interface, computer program product, system, apparatus, or any combination thereof. Accordingly, the disclosure of the present invention is intended to be illustrative, but not limiting, of the scope of the invention, which is set forth in the following claims.

What is claimed is:

1. A computer-implemented method for capturing and presenting node sequence data, comprising:
   receiving input designating a target path comprising a sequence of nodes, the target path further comprising at least one wild card;
   retrieving, from a stored log, a plurality of records comprising node sequence data;
   filtering the retrieved records to identify records corresponding to node sequences that match the target path; and
   outputting a report based on the identified records.

2. The method of claim 1, wherein the node sequence data comprises website visitation path data, and wherein each node corresponds to at least one web page.

3. The method of claim 2, further comprising, prior to retrieving the plurality of records:
   monitoring web page visits; and
   storing, in the log, records representing the monitored web page visits.

4. The method of claim 1, wherein the target path comprises a node corresponding to an entry point.

5. The method of claim 1, wherein the target path comprises a node corresponding to an exit point.

6. The method of claim 1, wherein outputting the report comprises outputting a report indicating relative frequencies of occurrence of node sequences.

7. The method of claim 1, wherein outputting the report comprises outputting a report indicating relative frequencies of occurrence of node sequences that match the target path.

8. The method of claim 1, wherein outputting the report comprises outputting a graph including lines depicting node sequences, wherein a visual characteristic of the lines indicates relative frequency of occurrence of node sequences.

9. The method of claim 8, wherein the visual characteristic is thickness.

10. The method of claim 8, wherein the visual characteristic is color.

11. A system for capturing and presenting node sequence data, comprising:
a log, for storing a plurality of records comprising node sequence data;
an input device, for receiving input designating a target path comprising a sequence of nodes, the target path further comprising at least one wild card;
a path analysis module, coupled to the log and to the input device, for retrieving records and for filtering the retrieved records to identify records corresponding to node sequences that match the target path; and
an output device, coupled to the path analysis module, for outputting a report based on the identified records.

12. The system of claim 11, wherein the node sequence data comprises website visitation path data, and wherein each node corresponds to at least one web page.

13. The system of claim 12, further comprising:
a tracking server, coupled to the log, for monitoring web page visits and for transmitting a signal to the log to store records representing the monitored web page visits.

14. The system of claim 11, wherein the target path comprises a node corresponding to an entry point.

15. The system of claim 11, wherein the target path comprises a node corresponding to an exit point.

16. The system of claim 11, wherein the output device outputs a report indicating relative frequencies of occurrence of node sequences.

17. The system of claim 11, wherein the output device outputs a report indicating relative frequencies of occurrence of node sequences that match the target path.

18. The system of claim 11, wherein the report comprises a graph including lines depicting node sequences, wherein a visual characteristic of the lines indicates relative frequency of occurrence of node sequences.

19. The system of claim 18, wherein the visual characteristic is thickness.

20. The system of claim 18, wherein the visual characteristic is color.

21. A computer program product for capturing and presenting node sequence data, comprising:
a computer-readable storage medium; and
computer program code, encoded on the medium, for:
receiving input designating a target path comprising a sequence of nodes, the target path further comprising at least one wild card;
retrieving, from a stored log, a plurality of records comprising node sequence data;
filtering the retrieved records to identify records corresponding to node sequences that match the target path; and
outputting a report based on the identified records.

22. The computer program product of claim 21, wherein the node sequence data comprises website visitation path data, and wherein each node corresponds to at least one web page.

23. The computer program product of claim 22, further comprising computer program code, encoded on the medium, for, prior to retrieving the plurality of records:
monitoring web page visits; and
storing, in the log, records representing the monitored web page visits.

24. The computer program product of claim 21, wherein the target path comprises a node corresponding to an entry point.

25. The computer program product of claim 21, wherein the target path comprises a node corresponding to an exit point.

26. The computer program product of claim 21, wherein the computer program code for outputting the report comprises computer program code for outputting a report indicating relative frequencies of occurrence of node sequences.

27. The computer program product of claim 21, wherein the computer program code for outputting the report comprises computer program code for outputting a report indicating relative frequencies of occurrence of node sequences that match the target path.

28. The computer program product of claim 21, wherein the computer program code for outputting the report comprises computer program code for outputting a graph including lines depicting node sequences, wherein a visual characteristic of the lines indicates relative frequency of occurrence of node sequences.

29. The computer program product of claim 28, wherein the visual characteristic is thickness.

30. The computer program product of claim 28, wherein the visual characteristic is color.

* * * * *